United States Patent [19]

Rossbach

[11] 4,406,528
[45] Sep. 27, 1983

[54] MOTION PICTURE APPARATUS

[75] Inventor: Horst Rossbach, Eichenau, Fed. Rep. of Germany

[73] Assignee: Agfa-Gevaert AG, Leverkusen, Fed. Rep. of Germany

[21] Appl. No.: 294,168

[22] Filed: Aug. 19, 1981

[30] Foreign Application Priority Data

Aug. 19, 1980 [DE] Fed. Rep. of Germany ....... 3031305

[51] Int. Cl.$^3$ ............................................ G03B 21/38
[52] U.S. Cl. ...................................... 352/169; 352/137
[58] Field of Search ................ 352/169, 92, 137, 121

[56] References Cited

U.S. PATENT DOCUMENTS

| | | | |
|---|---|---|---|
| 3,368,863 | 2/1968 | Mueller | 352/169 |
| 3,432,228 | 3/1969 | Hellmund | 352/169 |
| 3,788,736 | 1/1974 | Oulevay et al. | 352/169 |
| 3,851,959 | 12/1974 | Kreutze et al. | 352/169 |
| 3,958,872 | 5/1976 | Roth | 352/169 |

Primary Examiner—Monroe H. Hayes

Attorney, Agent, or Firm—Michael J. Striker

[57] ABSTRACT

A motion picture apparatus is provided which comprises a rotary disc shutter having a shutter sector and actuated by an electric drive device. A claw mechanism is controlled by the electric drive device and provides for transport of a film. An electromagnetic solenoid provides for stopping the film in position. A plunger for the solenoid is provided for disengaging the claw transport mechanism after a frame transport phase upon generation of an appropriate signal. A position signal generator provides a shutter position signal depending on the position of the shutter sector and a marking signal generator provides a signal depending on the detection of a marking placed on the film. The position signal generator is connected to a first input of an AND gate and the marking signal generator is connected to a second input of the AND gate. The output of the AND gate is connected to the solenoid.

The apparatus and a corresponding method provide for stopping a film without interference in proper position.

21 Claims, 5 Drawing Figures

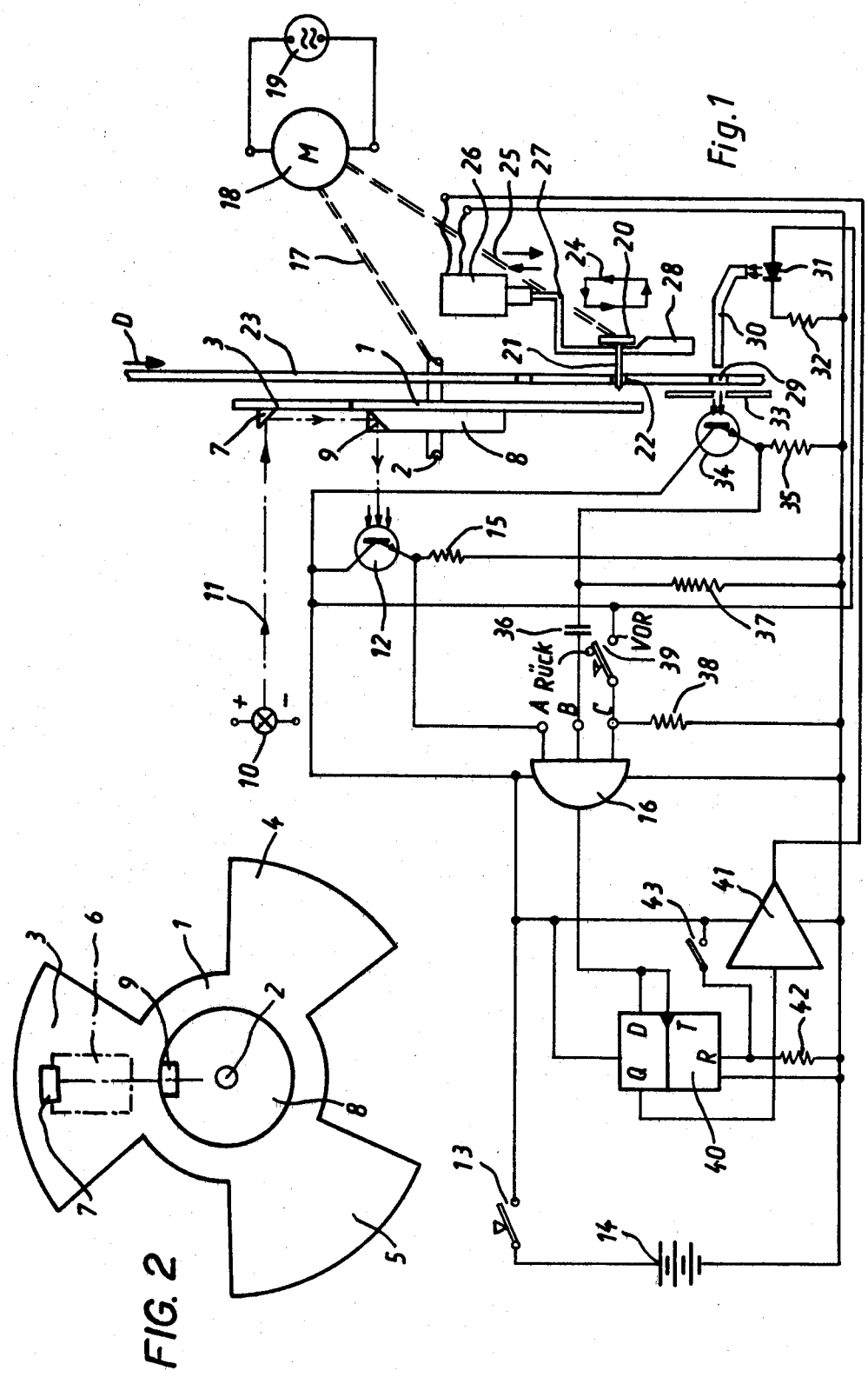

MOTION PICTURE APPARATUS

BACKGROUND OF THE INVENTION

1. Field of the Invention

The present invention relates to a motion picture apparatus and preferably a motion picture projector having a rotary disc shutter driven by an electric drive and a claw mechanism controlled by the electric drive to transport the film.

2. Brief Description of the Background of the Invention Including Prior Art

In the projection of motion pictures there is the requirement of having to move the film through the image plane and to assure by some intermittent mechanism that at the same time each frame of the film is stationary when projected on the screen.

Conventional mechanisms include claw mechanisms where the pins of the claw engage in the sprocket holes of the film and a cam mechanism serves to move the claw down, withdraw it from the film, and move it up again by a suitable number of sprocket holes ready for the next movement.

Another mechanism of this kind is a maltese cross mechanism employing a four pointed star wheel with slits in each point, these slits corresponding to the gaps between the arms of the maltese cross. A wheel with a pin projecting from one side rotates next to the cross in such a way that the pin engages in one of the slits for each rotation of the wheel and moves the cross through 90°. The maltese cross is connected to a sprocket wheel which moves the film through the appropriate number of frames.

A claw mechanism, in the blocking position for the film gate of a shutter sector, can transport the film frame by frame and which mechanism can be stopped in proper position by the film frame by a control device responding to markings placed on the film.

SUMMARY OF THE INVENTION

1. Purposes of the Invention

It is an object of the present invention to provide a motion picture apparatus allowing for a stopping of the film in proper position simply and without large expenditures and without interferences, where the stopping is to occur only in response to markings located on the film.

It is another object of the present invention to provide a for a stopping of the film induced only by markings provided for this purpose and not by joints in the film, at transition points between leaders and film as well as a clear film copy being signals for stopping to be picked up by the film drive.

It is a further object of the present invention to provide a film transport mechanism, which stops the film upon optical signals provided by markings on the film.

These and other objects and advantages of the present invention will become evident from the description which follows.

2. Brief Description of the Invention

The present invention provides a motion picture apparatus which comprises a rotary disc shutter actuated by an electric drive device and a shutter sector forms part of the rotary shutter. A claw mechanism is controlled by the electric drive and provides for transport of the film. An electromagnet provides for stopping of the film at appropriate positions and a solenoid plunger is associated with the electromagnet and suitable for disengaging the claw transport mechanism from the film perforation after a film transport phase. A position signal generator provides a shutter position signal depending on the position of the shutter sector. A marking signal generator provides a signal depending on the presence of a marking on a film. An AND gate has its output connected to the electromagnet and has its first input connected to the position signal generator and has its second signal input connected to the marking signal generator.

Preferably, the motion picture apparatus is a projector. The position signal generator can provide a signal during the time the shutter blocks the film gate. The marking signal generator can provide a signal during the time while the position signal generator is providing a signal.

The motion picture apparatus can further comprise a first light source for generating electromagnetic radiation, a deflection mirror disposed about the middle of a sector of the rotary disc shutter and receiving radiation from the light source, a first optoelectronic converter for receiving radiation reflected by the deflection mirror. The first light source, the deflection mirror and the first optoelectronic converter can form part of the position signal generator. The rotary disc shutter can have attached a shoulder and a second deflection mirror can be disposed at the shoulder for folding the path of the light radiation into a direction parallel to the rotary axis of the disc shutter.

The motion picture apparatus can also comprise a second light source providing electromagnetic radiation and forming part of the marking signal generator, a second optoelectronic converter for receiving radiation from the second light source and forming part of the marking signal generator and a differential element connected to the optoelectronic converter. Preferably, the second light source is a light emitting diode. An optical wave guide can be disposed between the light emitting diode and the film. The marking signal generator can respond to markings displaced by a preset number of frame widths from the film gate center, and is preferably displaced by from one to five frame widths from the center of the film gate. The marking can be positioned at about the middle of a frame near the edge of the film.

There can also be provided a switch closed during the advancing motion of the film and open during reverse motion of the film and connected to a further input of the AND gate for providing full potential to the AND gate while the switch is in closed position. A cycled memory stage can be connected to the output of the AND gate and a reset switch can be connected to the cycled memory stage for resetting the same.

The motion picture apparatus of the present invention can further comprise a claw lever forming part of the claw mechanism, a solenoid plunger lever movable in a direction parallel to the direction of the film transport, a register pin disposed at the claw lever where an attachment at the solenoid plunger lever engages the claw lever upon pulling in of the solenoid plunger and thereby prevents an insertion of the register pin into the film perforation while the claw mechanism remains energized.

There is also provided a method for controlling the advancing motion of a motion picture which comprises rotating a rotary disc shutter having a shutter sector; generating a signal corresponding to the position of the shutter sector, transporting the film with a claw type film advance while the shutter sector blocks the film gate; sensing markings on a film with a sensing device, generating control signals depending on the markings sensed, gating signals corresponding to a shutter sector position blocking the film gate and the generated control signals in an AND gate and stopping the film into a stationary position upon a respective command signal provided by the output of the AND gate.

The rotary disc shutter can be employed for interrupting a light beam in order to generate a signal corresponding to the position of the shutter sector. The light beam can be deflected at certain positions of the rotary disc shutter. The light beam can be path-folded into a direction parallel to the axis of the rotary disc shutter by attaching a second mirror to the rotary disc shutter. The resulting light beam pulses can be sensed with an optoelectronic converter. The markings on the film can also be sensed with a light beam and the modified resulting beam can be converted into electrical signals by way of an optoelectronic converter. The light beam can be guided between the light source and the film with an optical guide. The AND gate can be deactivated with a switch while the film is running in a reverse direction. A register pin can be inserted into the film perforation for transporting the film. The motion of the register pin can be controlled with an electromagnet.

The novel feature which are considered as characteristic for the invention are set forth in particular in the appended claims. The invention itself, however, both as to its construction and its method of operation, together with additional objects and advantages thereof, will be best understood when read in connection with the accompanying drawing.

BRIEF DESCRIPTION OF THE DRAWING

In the accompanying drawings in which is shown one of the various possible embodiments of the present invention:

FIG. 1 is a view of a schematic representation of a film transport and stop provision, FIG. 2 is a view along the rotation axis of a schematic representation of the rotary disc shutter with the film gate blocked.

DESCRIPTION OF INVENTION AND PREFERRED EMBODIMENTS

Figure 3:
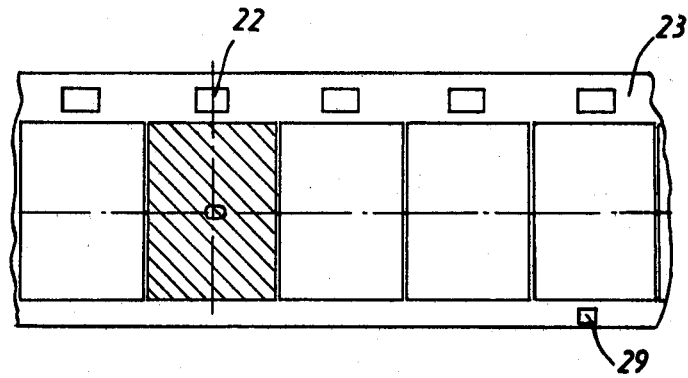
FIG. 3 is a view of a schematic picture of a film with a marking.

In accordance with the present invention there is provided an electromagnet to the control device, which magnet is influenced by the output of an AND gate. The electromagnet can render ineffective by way of its armature or solenoid plunger the claw mechanism at the end of a frame transport phase. A first control input of the AND gate is connected to the position signal generator providing a shutter sector position signal while the film gate is blocked by the shutter sector. A second control input of the AND gate is connected to a marking sensing signal generator providing a signal during the phase of the position signal. This achieves advantageously, that the marking signal generator is prepared by the signals at the first control input of the AND gate and that a signal is provided by the AND gate upon the sensing of a marking position. This assures that a sensed signal becomes only effective if also simultaneously a preparing signal from the rotary disc shutter is present.

According to a feature of the invention the position signal generator comprises a light source, at least one mirror disposed at one of the sectors of the rotary disc shutter and an optoelectronic converter, where the deflection mirror is provided in the area of the middle line of a sector of the disc shutter. Optoelectronic converters include devices generating electrical signals upon incidence of light such as for example photovoltaic diodes, photoresistors, photomultipliers and the like.

In accordance with a further feature the marking signal generator is provided with a light source, preferably a light emitting diode, a light to electric signal converter as well as a following differential element. The marking sensing signal generator can be disposed displaced by a preset number of frames widths compared to the film gate center. At the same time the marking is preferably disposed at the middle of a picture width and at the edge of the film. Advantageously, a light guide is provided between the light emitting diode and the light guide.

In accordance with an advantageous feature of the present invention the AND gate is connected via a switch which is closed upon an advance motion of the film and which is open upon a reverse motion of the film to the full potential. This provides the advantage that the AND gate is only active with respect to signals if the film is set to run forward. In a reverse direction run of the film the markings on the film do not cause any effect.

In a further desired feature of the present invention the AND connecting stage is followed by a cycled memory stage, which has it reset connected to a reset key switch. This provides the advantage that upon occurence of a control signal at the output of the AND gate connecting stage this signal is fed to the memory stage and is stored so long until a reset pulse is fed to the reset input by actuation of the reset key.

According to a further embodiment by way of the magnet a solenoid plunger lever can be moved in a direction parallel to the transport direction of the film, where upon pulled in solenoid plunger lever an attachement provided at this lever engages the claw lever and prevents an insertion of the register pin into the film perforation while the claw lever is effectively connected to the drive mechanism.

According to another embodiment two deflection mirrors are provided, of which the second mirror is disposed at a shoulder of the rotary disc shutter and which redirects the light into a direction parallel to the rotation axis.

Referring now to FIG. 2 there is designated a rotary disc shutter as 1, which is rotatable around the axis 2. The rotary disc shutter 1 is provided with three sectors 3, 4, and 5 staggered by 120°. A film gate 6 is disposed behind the shutter sector 3 in the position of the rotary disc shutter shown. A deflection mirror 7 is disposed at the shutter sector 3. The rotary disc shutter 1 is provided with a shoulder 8, which has a bevel 9 formed as a deflection mirror. A lamp is designated as 10 and the radiation 11 from lamp 10 is fed to a phototransistor 12 via the mirrors 7 and 9. The phototransistor 12 can be connected with its collector via a switch 13 to the battery 14. An emitter resistor of the phototransistor 12 is designated as 15.

A connection runs from the emitter of the phototransistor 12 to a first input A of the AND gate 16.

The rotary disc shutter is connected to an electric motor 18 via a drive connection 17. The motor 18 is powered by an ac-voltage source 19.

A register pin 21 is provided at a claw lever 20. The register pin 21 engages the perforation 22 of a film 23 to be moved in the direction of arrow D. The claw lever 20 with pin 21 performs a cyclical motion.

As is not shown here in detail, the claw lever 20 is connected to the drive motor 18 via a cam device 25 provided with control curves.

A solenoid 26 is provided with a plunger 27, which can be moved in a direction parallel to the direction D of the film transport. The plunger 27 is provided with an attachment 28. In the released position of the plunger 27 the attachment is outside of the action range of the claw lever 20. The attachment 28 is moved within the range of motion of the claw lever 20 upon pulling in of the plunger of the solenoid 26 such that the claw lever 20 and respectively its register pin 21 cannot be inserted into the perforation 22 of the film 23.

The film 23 is provided with a marking 29, which in accordance with FIG. 1 is disposed in front of the end of a light guiding rod 30. A light emitting diode 31 is provided at the other end of the light guiding rod 30, which diode is connected in series to a resistor 32.

A pinhole is designated as 33 and a second phototransistor 34 is disposed in front of the pinhole 33. The collector of the second phototransistor 34 is also connected to the plus pole of the battery 14 via a switch 13. The emitter resistor is designated as 35. A connection leads from the emitter of the phototransistor 34 to a differentiating capacitor 36, to which is coordinated a differentiating resistor 37. A connection runs from the differentiating capacitor 36 to a second input B of the AND gate 16.

A third input C of the AND gate 16 is on the one hand connected to a resistor 38 and on the other hand connected to a switch 39, which is closed upon forward running of film 23 and which is open but running backward of film 23. When the switch 39 is in closed position the input C of the AND gate 16 is connectable to the plus potential of the battery 14.

The AND gate 16 is followed by a cycled memory stage 40, which is provided by a D(delay)-flip-flop. The output of the AND gate 16 is connected to both the cycle input T of the memory flip-flop 40 and the control input D of the memory flip-flop 40. The output Q of the flip-flop 40 is connected to an amplifier 41, the output of which is connected to the solenoid 26. The reset input 26 of the D-flip-flop is connected to a discharge resistor 42 and via a reset switch 43 to the plus pole of the battery 14.

Figure 4:
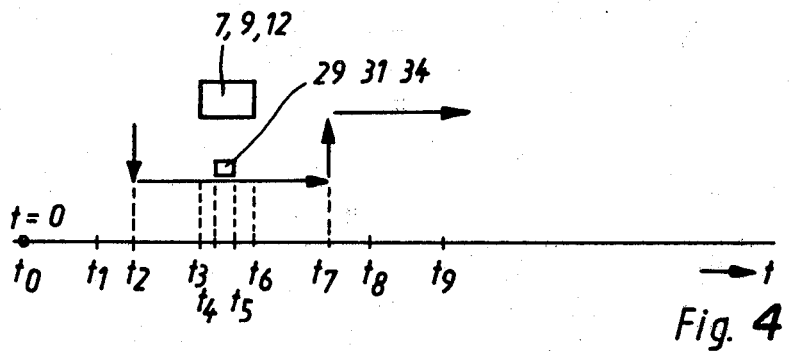
FIG. 4 is a view of a representation of the film position in the course of time.
Figure 5:
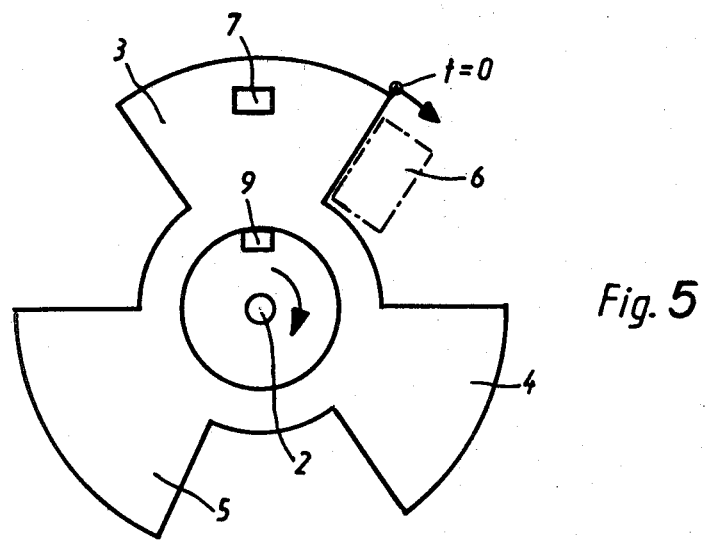
FIG. 5 is a view of a schematic representation of the shutter with coordinates to provide for a time correspondence of the claw motion and of the signal generation.

In the FIGS. 3 to 5 the parts according to FIGS. 1 and 2 are for corresponding parts designated with the same reference numeral.

According to FIG. 2 the film gate 6 is exactly in the middle of the sector blade 3. Since the mirror 7 is disposed in the region of the middle line of the sector blade 3, in this position light passes from the light source 10 via the mirrors 7 and 9 to the phototransistor 12 rendering the same conducting. Therefor, the plus potential is present at the input A of the AND gate 16. Furthermore, upon passing of the light marking 29 at the pinhole 33 a light signal from the light emitting diode 31 reaches the phototransistor 34. This light pulse is transferred to a second input of the AND gate 16 through the differentiating member 36, 37. The differentiating member 36, 37 effects that only the positive initial slope of the light pulse becomes effective.

Since the film is moved in the forward running direction D, the switch 39 is closed such that a plus potential is applied at the input C of the AND gate 16.

With the positive slope of the light pulse on the one hand a plus potential is fed to the cycle input T and on the other hand plus potential is fed to the control input D of the D-flip-flop 40 and shifted to the output Q. This potential is amplified in the amplifier 41 and fed to the solenoid 26, whose plunger 27 is pulled in with a certain time delay based on the inertia of the solenoid 26. The time delay is such that the picture frame just in the middle of its transport phase can complete its remaining phase of motion. Only when the register pin 21 is anyway lifted out, the attachment 28 engages the claw lever 20 and effects that the film is stopped at a proper position even though the claw mechanism remains connected.

Only when the reset key 43 is actuated also the D-flip-flop 40 is reset and thereby the solenoid 26 is deenergized. After the solenoid 26 is switched off the plunger 27 is transferred into the indicated position by way of a spring not shown here and thus the claw lever 20 is released.

In FIG. 3 the film 23 is shown with the perforation 22 and the light marking 29.

The time coordination of the events occuring during the blocking phase of the film gate 6 can be recognized from FIGS. 4 and 5. At the time $t=0$ the blocking of the film gate 6 starts. At the time $t_1$ the film gate 6 is just blocked. At the time $t_2$ the register pin 21 of the claw lever 20 is inserted into the perforation 22 of the film. Now the transport phase of the film commences, which phase terminates at time $t_7$. At time $t_7$ the register pin 21 releases the film perforation 22. Now the return motion of the register pin 21 is performed. At time $t_8$ the opening of the film gate 6 begins with the rear edge of the shutter sector 3. At the time $t_9$ the film gate 6 is fully open. During the blocking phase of the film gate 6 at time $t_3$ the phototransistor 12 is irradiated with light radiation 11 from the light source 10 via the deflection mirrors 7 and 9. The irradiation of the phototransistor 12 is terminated at time $t_6$. During the time of irradiation of the phototransistor 12 the phototransistor 34 receives radiation through the film marking 29. This radiation impinges beginning at time $t_4$ and ending at time $t_5$. Only during the time of overlap of the irradiation of both phototransistors 12 and 34 the AND gate becomes fully activated.

It will be understood that each of the elements described above, or two or more together, may also find a useful application in other types of system configurations and motion picture apparatus differing from the types described above.

While the invention has been illustrated and described as embodied in the context of a motion picture projector having a claw mechanism, it is not intended to be limited to the details shown, since various structural changes and modifications may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Motion picture apparatus comprising
   an electric drive device;
   a rotary disc shutter actuated by the electric drive device;
   a shutter sector forming part of the rotary shutter;
   a claw mechanism controlled by the electric drive device and providing for transport of a film;
   an electromagnet to provide for stopping the film in position;
   a solenoid plunger associated with the electromagnet and suitable for disengaging the claw transport mechanism after a frame transport phase;
   a position signal generator providing a shutter position signal depending on the position of the shutter sector;
   a marking signal generator for generating a signal depending on the position of a marking on the film;
   a source of control voltage;
   a first switch closed during advancing motion of the film and open during reverse motion of the film;
   a cycled memory stage having a reset input connected to said source of control voltage via a second switch; and
   an AND-gate having an output and three inputs, said output being connected to the electromagnet via said cycled memory stage, a first input being connected to the position signal generator, a second input being connected to the marking signal generator, and a third input being connected via said first switch to said source of control voltage for providing full potential to the third input of the AND-gate while the first switch is in closed position.

2. The motion picture apparatus according to claim 1 wherein the motion picture apparatus is a projector.

3. The motion picture apparatus according to claim 1 wherein the position signal generator provides a signal during the blocking time of the shutter.

4. The motion picture apparatus according to claim 1 wherein the marking signal generator provides a signal during the time while the position signal generator is providing a signal.

5. The motion picture generator according to claim 1 further comprising
   a first light source for generating electromagnetic radiation; a deflection mirror disposed about at the middle of a sector of the rotary shutter and receiving radiation from the light source;
   a first optoelectronic converter for receiving radiation reflected by the deflection mirror; and wherein the first light source, the deflection mirror and the optoelectronic converter form part of the position signal generator.

6. The motion picture apparatus according to claim 5 further comprising
   a shoulder at the rotary shutter; and
   a second deflection mirror disposed at the shoulder for folding the path of the radiation into a direction parallel to the rotary axis of the shutter.

7. The motion picture apparatus according to claim 1 further comprising
   a second light source providing electromagnetic radiation and forming part of the marking signal generator;
   a second optoelectronic converter for receiving radiation from the second light source and forming part of the marking signal generator; and
   a differential element connected to the optoelectronic converter.

8. The motion picture apparatus according to claim 7 wherein the second light source is a light emitting diode.

9. The motion picture apparatus according to claim 8 further comprising
   an optical waveguide disposed between the light emitting diode and the film.

10. The motion picture apparatus according to claim 7 wherein the marking signal generator responds to markings displaced by a preset number of frame widths from the film gate center.

11. The motion picture apparatus according to claim 10 wherein the marking signal is disposed from one to five frame widths from the center of the film gate.

12. The motion picture apparatus according to claim 1 wherein the marking is positioned at about the middle of a frame near the edge of the film.

13. The motion picture apparatus according to claim 1 further comprising
    a claw lever forming part of the claw mechanism;
    a solenoid plunger level movable in parallel direction to the direction of film transport;
    a register pin disposed at the claw lever where an attachment provided at the solenoid plunger lever engages the claw lever upon the pulling in of the solenoid plunger and thereby prevents an insertion of the register pin into the film perforation while the claw mechanism remains energized.

14. A method for controlling the advancing motion of a motion picture comprising
    rotating a rotary shutter having a shutter sector;
    transporting the film with a claw film advance while the shutter sector blocks a film gate and during the film advance generating a first signal corresponding to the position of the shutter sector relative to the film gate;
    sensing markings on a film with a sensing device and generating a second input signal depending on the markings sensed;
    generating a third input signal depending on the advancing motion of the film;
    gating the three signals in an AND-gate to produce an output control signal when all three input signals are present;
    storing the output control signal in a memory; and
    stopping the film in a stationary position when the output control signal is present.

15. The method for controlling according to claim 14 further comprising
    employing the rotary shutter for interrupting a light beam in order to generate a signal corresponding to the position of the shutter sector.

16. The method for controlling according to claim 15 further comprising
    deflecting at certain positions of the rotary shutter the light beam.

17. The method for controlling according to claim 15 further comprising path-folding the light beam into a direction parallel to the axis of the rotary shutter by attaching a second mirror to the shutter.

18. The method for controlling according to claim 15 further comprising
   sensing the interrupted light beam with an optoelectronic converter.

19. The method for controlling according to claim 14 further comprising
   sensing the markings on the film with a light beam.

20. The method for controlling according to claim 19 further comprising
   converting the light beam modified by the transmission of the film in the area of the markings with an optoelectronic converter.

21. The method for controlling according to claim 19 further comprising
   guiding the light beam between the light source and the film with an optical guide.

* * * * *